March 6, 1928.  H. A. FLOGAUS  1,661,420
BRAKE MECHANISM
Filed Jan. 2, 1924   3 Sheets-Sheet 2
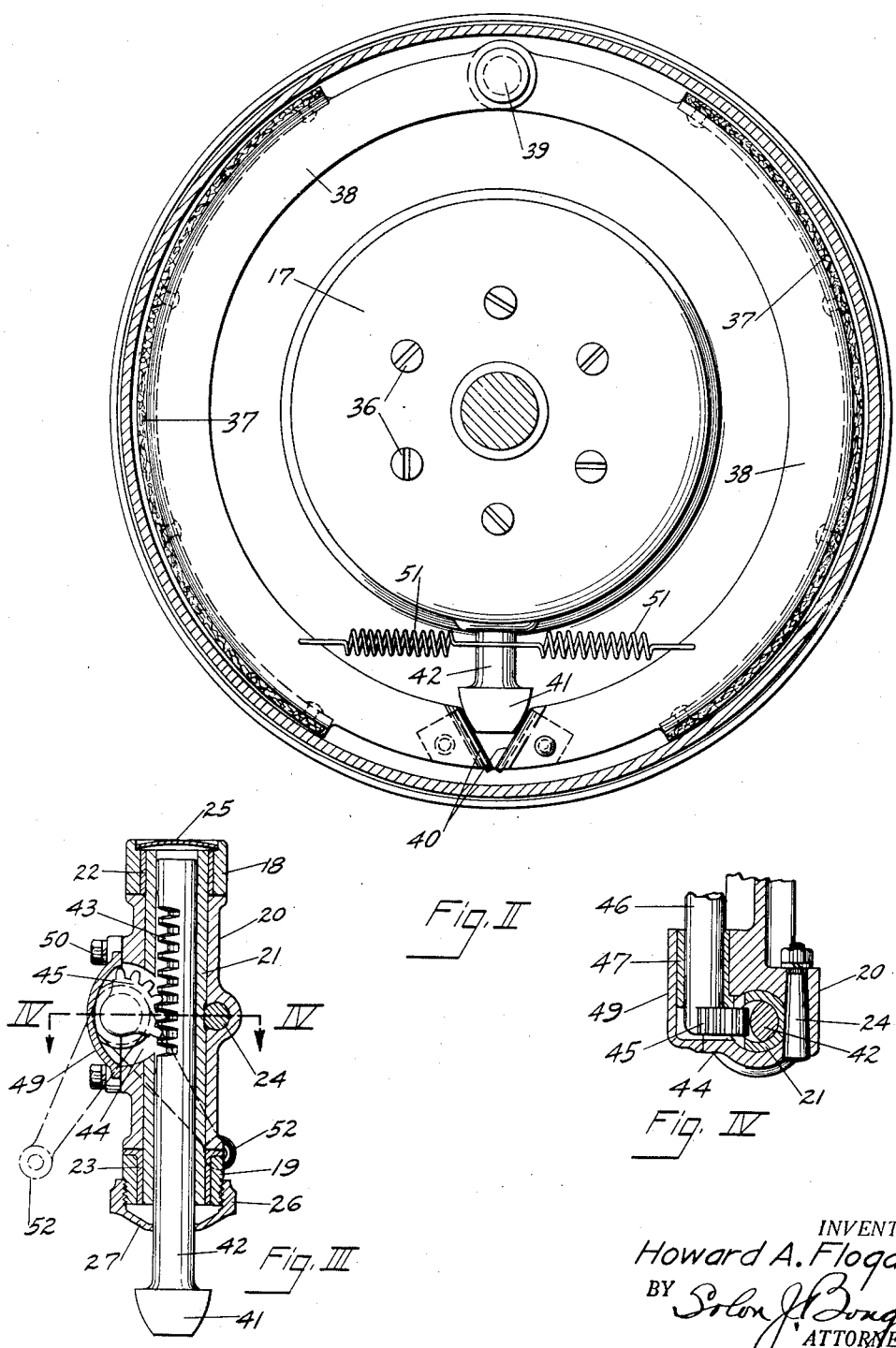
INVENTOR.
Howard A. Flogaus
BY Solon J. Boughton
ATTORNEY.

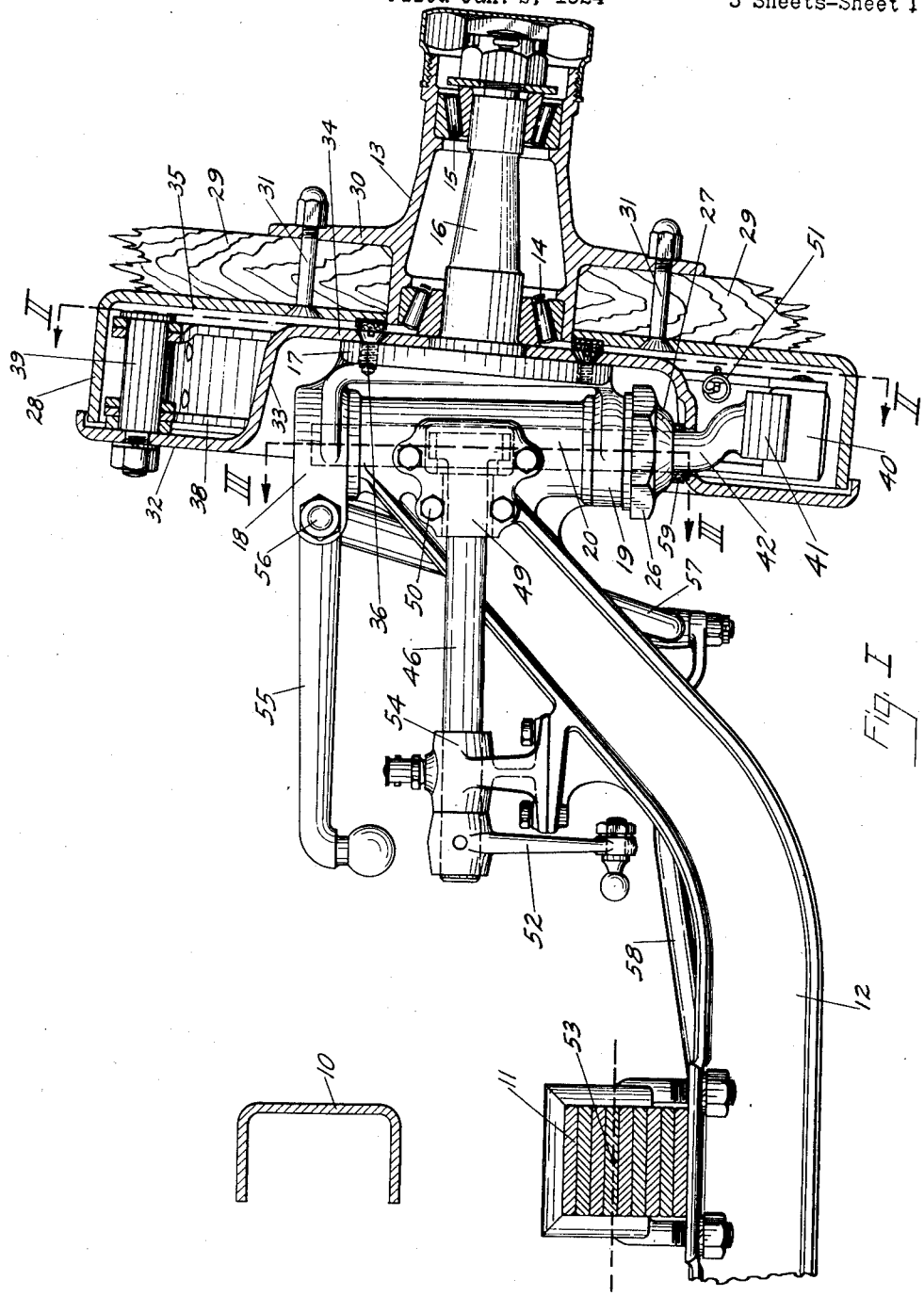

March 6, 1928.
H. A. FLOGAUS
1,661,420
BRAKE MECHANISM
Filed Jan. 2, 1924
3 Sheets-Sheet 3
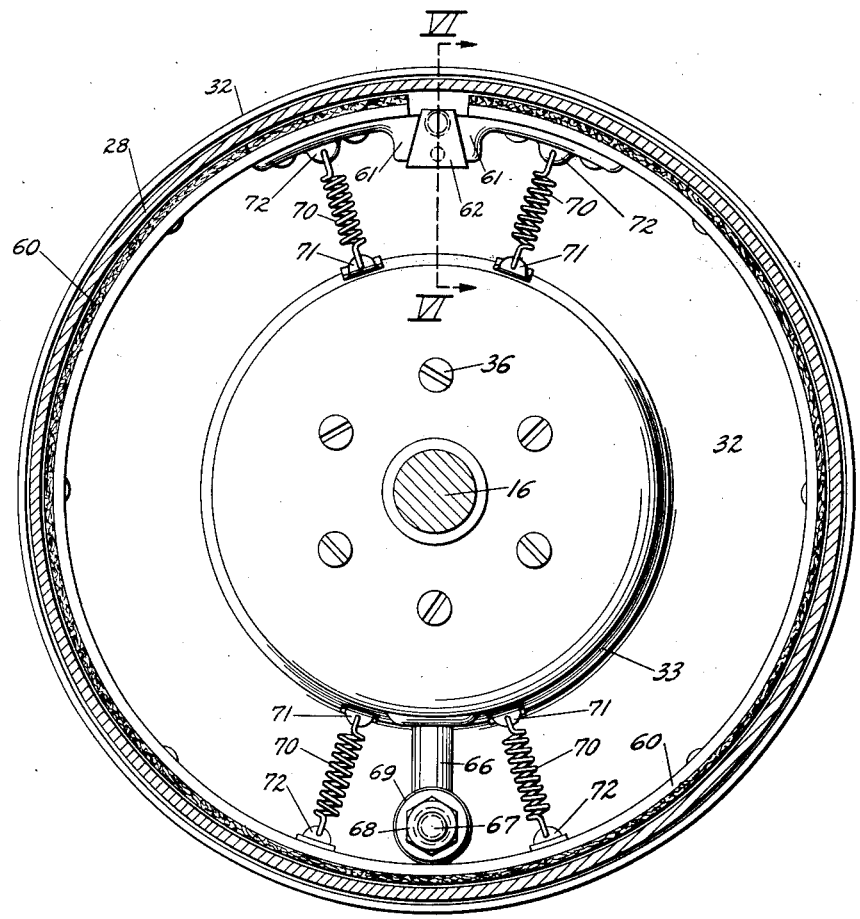
Fig. V
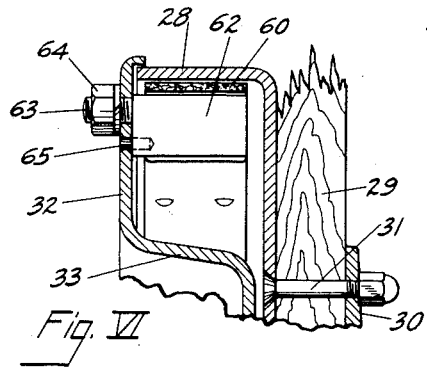
Fig. VI
INVENTOR.
Howard A. Flogaus
BY Solon J. Broughton
ATTORNEY.

Patented Mar. 6, 1928.

1,661,420

UNITED STATES PATENT OFFICE.

HOWARD A. FLOGAUS, OF TOLEDO, OHIO.

BRAKE MECHANISM.

Application filed January 2, 1924. Serial No. 683,989.

The present invention relates to improvements in brake mechanism adapted particularly for use with the front wheels of automobiles, and has for its object to provide a brake of simple construction and capable of being manufactured at a relatively low cost, one efficient in operation and thoroughly reliable, regardless of whether the wheels are moving straight ahead or turning.

A further object of the invention is to provide a front wheel brake so constructed as to permit the pivotal axis of the steering knuckle to be located within the brake drum and relatively close to the wheel spindle, with an operating plunger for the brake located within the knuckle and coincident with the axis thereof, together with means for operating the same from a point intermediate the ends of the knuckle, thus permitting the latter to have relatively long and well proportioned bearing surfaces within the drum, but without unduly increasing the size of the latter.

Another object of the invention is to provide the brake drum cover with a central dished portion adapted to lie close to the inner face of the wheel and to receive the knuckle, the latter being provided with a brake operating plunger extended through said dished portion into operative engagement with the brake band located within the drum.

Another object of the invention is to provide a brake drum with a band therein having each end freely supported for a limited movement, circumferentially of the drum, whereby to prevent buckling of the band when gripped by the drum, which tends to wrap or wind the band about the axis thereof.

Other objects will appear from the description to follow, covering certain embodiments of the invention, which, for the purposes of the present application, I have illustrated in the accompanying drawings, in which:

Figure I is a transverse sectional elevation of a front axle and wheel mounting, illustrating one embodiment of the invention.

Fig. II is a sectional elevation taken on line II—II of Fig. I.

Fig. III is a vertical section through the steering knuckle, taken on line III—III of Fig. I.

Fig. IV is a fragmentary sectional plan taken on line IV—IV of Fig. III.

Fig. V is a sectional elevation similar to Fig. II, showing a slightly modified form of the brake band support and operating means, and Fig. VI is a fragmentary sectional elevation taken on line VI—VI of Fig. V.

In the drawings I have shown at 10, one of the side frame members of a motor vehicle, overlying the usual front springs 11, supported by the front axle 12, as indicated in Fig. I. The hub 13 of the front wheel is provided with suitable inner and outer roller bearings 14 and 15 for supporting the spindle 16. The steering knuckle to which the spindle is connected, preferably comprises a forked member having a vertically disposed plate 17 provided with the upper and lower forks or arms 18 and 19 respectively, which are adapted to receive the opposite ends of the axle head 20, in which is mounted the hollow swivel pin or sleeve 21, the upper and lower ends of which are provided with bushings 22 and 23 respectively, the bushings being disposed within the forks 18 and 19, as shown in Fig. III. The sleeve 21 is preferably held within the head 20 by a transversely extending tapered pin 24, as shown in Fig. IV. The upper and lower arms 18 and 19 are provided with caps 25 and 26 respectively, the latter being threaded upon the arm 19 and having a depending convex portion 27 forming a seat thereon, provided for a purpose which will presently be described.

The usual type of brake drum 28 is secured to the spokes 29 of the wheel, and to the flange 30 of the hub 13, by bolts 31. However, this construction may be varied as desired, depending on the type of wheel to be used. The brake drum cover or closure 32 is dished outwardly, as indicated at 33, and the outer wall 34 thereof is disposed between the vertical wall 35 of the drum and the upstanding plate member 17 of the spindle, and secured thereto by means of suitable screws or bolts 36. This construction permits the knuckle to be carried substantially within the confines of the drum and close to the wheel, as shown in Fig. I.

Any suitable form of brake mechanism may be positioned within the drum, capable of being moved into frictional engagement therewith, such for example, as the semicircular brake bands 37 carried by the channel-shaped members 38, pivoted upon a bolt 39, which is anchored upon the drum cover plate as shown in Fig. I. The adjacent lower ends of the pivoted members 38 are provided with reversely inclined surfaces 40 adapted to be engaged by the wedge-shaped end 41 of a plunger 42 mounted to reciprocate within the steering knuckle. The plunger is provided with teeth 43 lying opposite an opening 44 in the wall of the knuckle and sleeve 21, and is adapted to be operatively engaged by a gear segment 45 projecting through the opening, said segment being secured to the end of an operating rod journaled in a suitable bearing 47, held in place by a removable cover plate 49 which is attached to the knuckle by suitable screws or bolts 50, as shown in Figs. I and III. The teeth 43 of the plunger are curved in such a manner as to permit them to ride freely on the teeth of the segment 45 when the plunger oscillates with the drum at such times as the wheel is caused to swing about the axis of the knuckle.

The brake bands are normally held out of contact with the brake drum by a suitable spring 51, as shown in Fig. II. The bands are forced into engagement with the drum through depression of the plunger 42, when it is desired to apply the brakes, this being effected by moving the crank-arm 52 on the end of the operating rod 46 from right to left, as viewed in Fig. III, the extreme positions of the arm being shown by dotted lines in this figure. Operation of the arm 52 may be effected by any suitable mechanism (not shown), under the control of the driver. It will be noted that the lower or operating end of the arm is substantially opposite the point 53 of the front spring 11, this being the point about which the axle tends to turn when the machine is stopped by the application of the brakes. By thus locating the point of connection of the body portion of the brake operating mechanism (not shown), with that on the axle, the movement of said operating mechanism, due to the turning movement of the axle on application of the brakes, will be reduced to a minimum.

The inner end of the rod 46 is journaled in a bearing 54 which is removably connected with the axle 12.

The pivotal movement of the wheel is effected by means of an operating arm 55 shown connected with the upper fork 18 of the steering knuckle, preferably by means of a bolt 56, the arm 55 having connected therewith, a downwardly extending arm 57 to which is connected a cross-rod 58 adapted to control the wheel on the opposite end of the axle.

A washer 59 of felt or other suitable material is positioned upon the plunger 42 between the convex portion 27 of the nut 26 and the dished portion 33 of the cover 32, at the point where the plunger passes through the cover, whereby to close the opening in the latter which is made large enough to permit free movement of the wheel without causing the cover to bind upon the plunger. The washer may be clamped upon the cover, if desired, by adjustment of the nut 26, as will be apparent from the disclosure in Fig. I.

In the modification shown in Figs. V and VI, a single band 60 is mounted within the drum, with its ends 61 freely engaging a wedge or spacing member 62 having a threaded extension 63 projecting through the cover 32 and secured by a nut 64. A dowel pin 65 serves to prevent turning of the wedge about the center of the extension 63. A plunger 66 is mounted within the steering knuckle and is projected through the wall 33 of the cover 32 and operated in the same manner as the plunger 42 in Fig. III. In this case, however, the plunger is provided with a right angle portion 67 on its lower end, threaded to receive a nut 68 for securing thereon a roller 69 adapted to ride freely upon the brake band 60, preferably at a point substantially opposite the spacing member 62, the depression of the plunger serving to force the band into frictional engagement with the drum. Springs 70 are connected at one end with the dished portion 33 of the cover 32 by means of brackets 71, and have their opposite ends connected with the brake band 60 by means of brackets or lugs 72, the springs serving to normally hold the band out of engagement with the drum. The springs are preferably provided at opposite sides of the drum, as shown in Fig. V, and additional springs may be located between these points, if desired. The purpose of tapering the wedge 62 in the manner shown in Fig. V, is to permit the free ends of the brake band each to have a limited movement circumferentially of the drum, one toward the other and toward the center of the wedge when the brake is applied, whereby to prevent the band from buckling between the point of contact of the plunger and the wedge. Assuming that the drum is rotating counter-clockwise, as viewed in Fig. V, then, when the plunger is depressed to force the band into engagement with the drum, a wrapping action will take place, with the drum tending to wind the band around its axis. In this particular case, if the free end of the band at the right of the wedge in Fig. V is not permitted to move outwardly and circumferentially toward the center of the wedge, the wrapping action produced by the drum may cause the band to buckle at a point between the plunger and the wedge. Buckling is therefore prevented by allowing the end of the band to move on the inclined surface of the wedge toward the center thereof. If the drum is moving clockwise, as viewed in Fig. V, the result will be the same, except that the end of the band on the left of the wedge, will move nearer the center thereof to relieve the tendency to buckle, when the brakes are applied. While I accomplish this result by means of a wedge mounted as shown in Fig. V, the same result can be produced by other means (not shown), adapted to permit the ends of the band to move circumferentially about the axis of the drum a slight amount when the brakes are applied.

Which I have shown and described in considerable detail, a specific embodiment of my invention, it is to be understood that this showing and description is illustrative only and for the purpose of rendering the invention more clear, and that I do not regard the invention as limited to the details of construction illustrated and described, except in so far as I have included such limitations within the terms of the following claims.

I claim as my invention:

1. In a motor vehicle, the combination with a wheel and axle and a spindle and steering knuckle connecting the same, of a brake for the wheel, an operating plunger therefor extending into the knuckle, and actuating means operatively connected with the plunger intermediate its ends and between the ends of the knuckle.

2. In a motor vehicle, the combination with a wheel and axle and a spindle and steering knuckle connecting the same, the knuckle including a sleeve forming a pivotal connection for the spindle, a brake for the wheel, an operating plunger therefor extending into the sleeve, and actuating means for the plunger engaging the same intermediate the ends thereof through an opening in the wall of the sleeve.

3. In a motor vehicle, the combination with a wheel and axle and a spindle and steering knuckle connecting the same, of a brake for the wheel, an operating plunger therefor extending into the knuckle and having teeth formed thereon between the ends of the knuckle, and a member operatively engaging the teeth of the plunger to effect application of the brake.

4. In a motor vehicle, the combination with a wheel and axle and a spindle and steering knuckle connecting the same, of a brake for the wheel, an operating plunger therefor extending into the knuckle and having teeth formed thereon between the ends of the knuckle, and an operating member for the plunger having a tooth portion adapted to engage the teeth of the plunger through an opening in the wall of the knuckle whereby to effect application of the brake.

5. In a motor vehicle, the combination with a wheel and axle and a spindle and steering knuckle connecting the same, of a brake for the wheel, an operating plunger therefor extending into the knuckle, a rod journaled upon the axle and operatively connected with the plunger intermediate the ends thereof, said rod being operatively connected therewith through the wall of the knuckle intermediate the ends of the latter, and an operating connection for the rod.

6. In a motor vehicle, the combination with a wheel and axle and a spindle and steering knuckle connecting the same, of a brake for the wheel, an operating plunger therefor extending into the knuckle, a bearing secured upon the axle, a rod journaled in the bearing and extending substantially parallel to the general direction of the axle and into operative engagement with the plunger intermediate the ends thereof and between the ends of the knuckle, and an operating connection for the rod.

7. In a motor vehicle, the combination with a wheel and axle and a spindle and steering knuckle connecting the same, of a brake for the wheel, an operating plunger therefor extending into the knuckle, the latter having a transverse opening through its wall, an operating member for the plunger operatively connected therewith intermediate the ends thereof and extending through said opening, and a closure for the opening forming a support for the operating member.

8. In a motor vehicle, the combination with a wheel and axle and a spindle and steering knuckle connecting the same, of a brake for the wheel, an operating member for the brake extending substantially parallel with the axis of the steering knuckle and having teeth formed thereon, and an actuating member therefor including a gear segment adapted to engage the teeth of the operating member at a point between the ends of the knuckle.

9. In a motor vehicle, the combination with a wheel and axle and a spindle and steering knuckle connecting the same, of a brake drum secured to the wheel, a closure for the drum carried by the spindle and having a central dished portion within which the knuckle is mounted, a brake band supporting member carried by said closure within said drum, an operating member for the brake band supporting member concentric with said spindle and having a portion extending through the wall of said dished portion, and said extended portion being adapted to directly contact with said brake band supporting member for operating the same.

10. In a motor vehicle, the combination with a wheel and axle and a spindle and steering knuckle connecting the same, of a brake drum carried by the wheel, a closure for the drum carried by the spindle and having a central dished portion within which the knuckle is mounted, a brake supported by said closure within said drum, a plunger operatively engaging the brake and extending outwardly through the wall of said dished portion and mounted to slide in said steering knuckle, and means for reciprocating the plunger to effect control of the brakes.

11. In a motor vehicle, the combination with a wheel and axle and a spindle and steering knuckle connecting the same, of a brake drum secured to the wheel, a closure for the drum carried by the spindle and having an outwardly dished portion within which the knuckle is mounted, a brake within said drum, an operating member for the brake extending through the wall of said dished portion and into the knuckle, and means extending through the wall of the knuckle and operatively connected with said operating member.

12. In a motor vehicle, the combination with a wheel and axle and a spindle and steering knuckle connecting the same, of a brake drum secured to the wheel, a closure for the drum carried by the spindle and having an outwardly dished portion within which the knuckle is mounted, a brake within said drum, a plunger for operating the brake extending through the wall of said dished portion and into the knuckle, actuating means for said plunger, and a washer surrounding the plunger at a point between the knuckle and the dished portion of the closure.

In testimony whereof I affix my signature.

HOWARD A. FLOGAUS.